United States Patent [19]

Saracsan et al.

[11] 4,018,948

[45] Apr. 19, 1977

[54] METHOD OF COMPOUNDING RUBBER

[75] Inventors: Jeffrey W. Saracsan, Akron; Paul H. Sandstrom, Tallmadge, both of Ohio

[73] Assignee: The Goodyear Tire & Rubber Company, Akron, Ohio

[22] Filed: Sept. 4, 1975

[21] Appl. No.: 610,212

[52] U.S. Cl. .............................. 427/316; 427/385 B
[51] Int. Cl.$^2$ ..................... B05D 7/02; B32B 25/08
[58] Field of Search ....... 427/302, 333, 340, 385 B, 427/407 C, 400, 322, 316; 428/424, 425

[56] References Cited

UNITED STATES PATENTS

| 3,813,257 | 5/1974 | West | 428/425 |
| 3,837,892 | 9/1974 | Marzocchi | 427/407 |
| 3,862,882 | 1/1975 | Marzocchi | 428/424 |
| 3,892,885 | 7/1975 | Bragole | 428/425 |

*Primary Examiner*—James R. Hoffman
*Attorney, Agent, or Firm*—F. W. Brunner; J. D. Wolfe

[57] ABSTRACT

This invention relates to a method of adhering polyurethane to a cured rubber stock of the natural or synthetic type, where the rubber was compounded with a sulfur curative of at least one part of a polyol of less than 7000 molecular weight and cured. This composition would be useful for making white sidewalls and related laminates.

2 Claims, No Drawings

METHOD OF COMPOUNDING RUBBER

This invention relates to a method of compounding hydrocarbon rubbers in order to obtain excellent adhesion between the compounded hydrocarbon rubbers and polyurethane stocks.

Hydrocarbon rubbers such as natural rubbers and the synthetic diene rubbers are widely used in articles such as tires, tire building sleeves and bladders, hose, belts to mention only a few of their many and widely known uses.

It is desirable to adhere polyurethane to the cured elastomeric products such as tires, building sleeves, hose, belts and related rubber articles, but unfortunately, the adhesion of a polyurethane reaction mixture to the cured rubber is not entirely satisfactory. Consequently, the general practice is to use a tie gum or a tie stock to enhance the adhesion or to treat the cured hydrocarbon rubber surface with chlorine water and then water washing to obtain satisfactory adhesion upon application of the polyurethane reaction mixture.

We have discovered that if the hydrocarbon rubber is compounded with at least one and preferably two or more parts of a compatible hydroxyl material, the resulting cured rubber can be adhered to a polyurethane reaction mixture without the need to use a chlorine water washing or a tie gum to obtain a satisfactory bond between the two.

Representative of the many hydrocarbon rubbers that can be utilized in this invention are the natural and synthetic diene rubbers obtained by the homopolymerization of dienes containing from 4 to 12 carbon atoms with the unsaturation being either conjugated or non-conjugated or the copolymerization of these dienes with olefins of 2 to 20 carbon atoms such as ethylene, propylene, acrylonitrile, vinyl chloride or vinylidine chloride to obtain the so-called unsaturated or vulcanizing rubber. Also, the saturated rubbers such as EPDM, chlorobutyl or OPR rubbers may also be used. These rubbers may be compounded in the normal manner with the normal compounding agents except at least one and preferably two to five or more parts of hydroxyl terminated monomers or polymers are incorporated in the compounded rubber to aid in obtaining good bond to the polyurethane reaction mixture when cured to a polyurethane.

Representative members of the hydroxyl terminated polymers (preferably liquid polymers) are those obtained by hydroxyl terminating polybutadiene, butadiene acrylonitrile copolymers, polyisprene, butadiene-styrene copolymers, isoprene-styrene copolymers, preferably where the molecular weight of the hydroxyl terminated composition is less than about 6000 and more particularly 1000 to 3000. It should be appreciated that the monomeric glycols and triols such as those having two to 20 carbon atoms likewise can be used in this invention where they are essentially compatible with the compounded and cured hydrocarbon elastomer.

The composition of this invention can be prepared by compounding the hydrocarbon rubbers with suitable compounding agents, viz. sulfur, accelerators and fillers, and the hydroxyl terminated substance and then the compounded composition can be cured in the conventional manner to give articles of any shape to which a rubber may be shaped and then these shaped articles can be adhered to a polyurethane, preferably as a polyurethane reaction mixture and the polyurethane reaction mixture cured to give a laminate that has excellent peel resistance when the polyurethane is cured.

The polyurethanes useful in this invention broadly are the reaction product of an organic polyisocyanate and a reactive hydrogen containing substance preferably of the molecular weight of 500 or more and a suitable curing or crosslinking agent.

The nature of ingredients useful in making polyurethanes can be elucidated further by classing the organic isocyanates into mono, di, tri and higher isocyanates of the classes of aromatic, aliphatic and cycloaliphatic and the reactive hydrogen materials into polyether polyols, polyester polyols and hydrocarbon polyols where the polyol can be di, tri, tetra and etc. The specific nature of the ingredients needed to make a polyurethane mixture is further exemplified in U.S. Pat. Nos. 3,072,582, 2,866,774, 2,929,800 2,948,691, 3,401,143, 3,440,223, 3,563,849 and 3,574,127. The curative or crosslinking agents fall broadly into the amine and alcohol classes with the preferred amines being organic diamines and the alcohols being polyols suitable for reacting to make polyesters.

A butadiene-styrene copolymer rubber compounded with sufficient carbon black, sulfur, accelerator and extender oil to yield a stock suitable for a black coverstrip used in making a white sidewall tire was divided into two portions — a control stock and an experimental stock. To a 100 parts of the experimental stock two and five phr (parts per hundred) respectively of a liquid hydroxyl terminated butadiene/styrene having a viscosity at 30° C. of 225 centipoises was milled into the stock. The stocks were cured at 150° C. for 18 minutes.

An isocyanate adhesive was applied by painting over the cured stock and then each of the cured stocks was spray coated with a polyurethane reaction mixture to give a coating 15 mils thick after the spray coated stocks had stood for 21 hours at 82° C. The spray coating on each of the samples were cut with a razor blade to permit the spray coat to be grasped and pulled away.

The control sample had very poor adhesion between the polyurethane and the tire black cover strip. On the other hand, the experimental stock containing two phr of hydroxyl terminated butadiene/styrene showed moderate adhesion to the polyurethane spray coat while the experimentral stock containing five phr of hydroxyl terminated butadiene/styrene showed excellent adhesion to the polyurethane.

The isocyanate adhesive used to paint the cured black tire cover stock was made by dissolving nine parts of a soluble polyurethane of the type disclosed in U.S. Pat. No. 3,142,652 in 18 parts of dimethyl formamide, nine parts cyclohexane, 64 parts toluene and adding 10 parts of a commercial triisocyanate available under the trade name Desmodur N75 and 0.2 parts of stannous dioctoate to soluble polyurethane.

The polyurethane reaction mixture was prepared by mixing 400 parts of a diluted prepolymer of a phthalate polyester of 2000 molecular weight and bis cyclohexyl methane-4,4'-diisocyanate (50 percent by weight in toluene) with 80 parts of titanium dioxide, 80 parts toluene, 10 parts of powdery pyrosilica and 1.14 parts of stannous dioctate.

Similar results may be obtained if the black cover stock is compounded on the mill with a liquid hydroxyl terminated polybutadiene instead of the liquid hydroxyl butadiene/styrene. Also, the polyether glycols and polyester glycols or polyol can be used, as well. For example, polyproplylene ether glycol of 2000 to 3000 molecular weight or the polybutylene adipate ester of similar molecular weight may be used in place of the hydroxyl terminated butadiene/styrene of the above example.

Although any of the urethane catalysts can be utilized to advantage, the tin catalyst of the class of di(alkyl)tin-S,S'-bis(alkyl mercapto alkylate), where the alkyl and alkylate radicals contain from one to 20 carbon atoms, offer special handling advantages. For example, di(n-octyl) tin-S,S'-bis-(isooctyl mercapto acetate) offers advantages of long pot life to the polyurethane mixture having free NCO content, as free NCO does not react rapidly until the temperature exceeds 65° C. and then the reaction is relatively short at 65° to 85° C.

This invention provides a method of adhering a polyurethane to a cured rubber stock selected from the class of natural an synthetic rubbers comprising compounding a hundred parts of rubber with a sulfur curative and at least one part of a polyol of less than 7000 molecular weight selected from the class of polyester polyol, polyether polyol and hydrocarbon polyol, curing the compounded rubber, applying a coating of a polyurethane to the compounded rubber in the presence of free NCO and reacting the free NCO with the polyol to adhere the polyurethane to the cured rubber. Preferably, the free NCO is about one to 10 percent in the coating and can be present in a prepolymer or as the organic polyisocyanate.

While certain representative embodiments and details have been shown for the purpose of illustrating the invention, it will be apparent to those skilled in this art that various changes and modifications may be made therein without departing from the spirit or scope of the invention.

What is claimed is:

1. A method of adhering a polyurethane to a cured rubber stock selected from the class of natural and synthetic hydrocarbon rubbers comprising compounding a hundred parts of rubber with a sulfur curative and at least one part of a polyol of less than 7000 molecular weight selected from the class of polyester polyol, polyether polyol and hydrocarbon polyol, curing the compounded rubber adhering a coating of a polyurethane to the compounded rubber by reacting free NCO of the polyurethane with the polyol to adhere the polyurethane to the cured rubber.

2. The method of claim 1 wherein the rubber is a butadiene/styrene copolymer compounded with a liquid hydroxyl terminated butadiene/styrene polymer.

* * * * *